United States Patent [19]

Suenaga et al.

[11] Patent Number: 5,395,552
[45] Date of Patent: Mar. 7, 1995

[54] FERRO-ELECTRIC LIQUID CRYSTAL ELECTROL-OPTICAL DEVICE

[75] Inventors: Hitoshi Suenaga, Itami; Masaaki Taguchi, Tokyo, both of Japan

[73] Assignees: Seiko Instruments Inc.; Teikoku Chemical Industry Co., Ltd., both of Japan

[21] Appl. No.: 17,347

[22] Filed: Feb. 10, 1993

Related U.S. Application Data

[63] Continuation of Ser. No. 537,413, Jun. 13, 1990, abandoned.

[30] Foreign Application Priority Data

Jun. 19, 1989 [JP] Japan ................... 1-158040

[51] Int. Cl.$^6$ .................. C09K 19/34; C09K 19/52; G02F 1/13
[52] U.S. Cl. ............... 252/299.61; 252/299.01; 252/299.66; 359/103; 359/104
[58] Field of Search ............... 252/299.01, 299.63, 252/299.61, 299.66; 359/103, 104

[56] References Cited

U.S. PATENT DOCUMENTS

| | | | |
|---|---|---|---|
| 4,657,695 | 4/1987 | Saito et al. | 252/299.61 |
| 4,939,003 | 7/1990 | Aoki et al. | 350/341 |
| 5,053,163 | 10/1991 | Takeshita et al. | 252/299.61 |

FOREIGN PATENT DOCUMENTS

| | | |
|---|---|---|
| 1272017 | 7/1990 | Canada. |
| 0160416 | 11/1985 | European Pat. Off.. |
| 0277815 | 8/1988 | European Pat. Off.. |
| 0281424 | 9/1988 | European Pat. Off.. |
| 0345091 | 12/1989 | European Pat. Off.. |
| 0352054 | 1/1990 | European Pat. Off.. |
| 8606401 | 11/1986 | Germany. |

*Primary Examiner*—Shean Wu
*Attorney, Agent, or Firm*—Bruce L. Adams; Van C. Wilks

[57] ABSTRACT

A ferroelectric liquid crystal electro-optical device comprises a pair of plates having driving electrodes and ferroelectric liquid crystal material having a negative dielectric anisotropy. The ferroelectric liquid crystal material comprises a ferroelectric liquid crystal composition 10 to 80% by weight of a compound of the general formula:

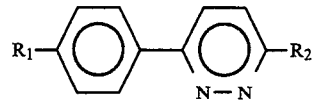

wherein $R_1$ represents a straight-chain alkyl or alkoxy group, or an alkyl, alkoxy, alkoxyalkyl or acyloxy group each having an asymmetric carbon atom, and $R_2$ represents a straight-chain alkyl group having an assymmetric carbon.

9 Claims, 2 Drawing Sheets

FERRO-ELECTRIC LIQUID CRYSTAL ELECTRO-OPTICAL DEVICE

This is a continuation of parent application Ser. No. 07/537,413, filed Jun. 13, 1990, now abandoned.

BACKGROUND OF THE INVENTION

1. Field of the Invention

The present invention relates to a liquid crystal electro-optical device such as a display device, a shutter array for printers, a shutter for camera or an optical shutter for window, using a ferroelectric liquid crystal having a negative dielectric anisotropy. More particularly, the present invention relates to an improvement in AC-field stabilization effect using phenylpyridazine liquid crystal materials.

2. Description of the Related Art

After Clark and Lagaval proposed a surface-stabilizing method in 1980, intensive investigations have been made for the purpose of utilizing a ferroelectric liquid crystal element as a display element or shutter array.

Figure 1A:
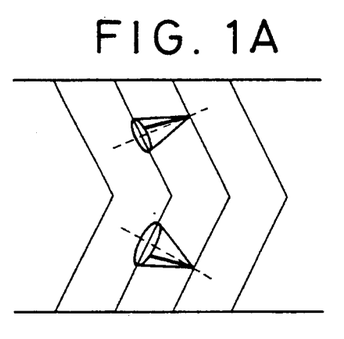
FIG. 1A is a schematic view of the chevron structure of the ferroelectric liquid crystal layer.
Figure 1B:
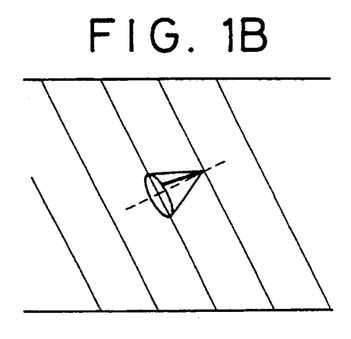
FIG. 1B is a schematic view of the slant layers.
Figure 2:
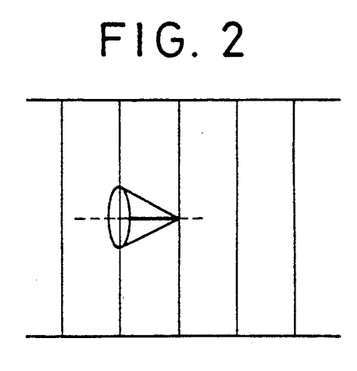
FIG. 2 is a schematic view of an ideal book-shelf structure.

However, when a ferroelectric liquid crystal phase is formed in an oriented liquid crystal cell, the layers of the smectic phase are bent to form a so-called chevron structure as shown in FIG. 1A or the layers slant and the apparent cone angle between the bi-stable states is narrow as shown in FIG. 1B. Thus an angle of about 45° indicating an ideal orientation, the switching between the bi-stable states, as shown in FIG. 2 cannot be obtained. Further, when the interaction between the substrate surface and the spontaneous polarization of the ferroelectric liquid crystal is strong, no uniform orientation but a twist orientation is obtained.

A problem that the optical ON-OFF density ratio (contrast) is low for the above-described reasons has thus not been solved. Known processes for increasing the contrast include a process wherein an oblique deposited silicon oxide film is used as the oriented film to realize the bi-stable orientation state which is nearly the ideal orientation state and a process wherein a ferroelectric liquid crystal having a negative dielectric anisotropy is used in order to utilize the AC stabilized effect.

However, the process wherein an oblique deposited silicon oxide film is used as the oriented film is unsuitable for the mass-production and it necessitates a high cost, since a large vapor deposition apparatus is necessitated for forming a uniform film on a large substrate and a long time is taken for the film formation. A process wherein a ferroelectric liquid crystal having a negative dielectric anisotropy is used for utilizing the AC stabilized effect is disclosed in Japanese Patent Laid-Open Nos. 176097/1985, 192020/1988, 201629/1988, 210825/1988, etc. However, a high voltage and a high frequency are necessitated for obtaining a high AC stabilized effect and, therefore, a driver IC used in an ordinary driver circuit of a liquid crystal display element cannot be used or a complicated driver circuit is necessitated.

Generally a ferroelectric liquid crystal having a negative dielectric anisotropy of a high absolute value tends to bring about a strong intermolecular interaction and a high response speed. Accordingly, the width of the voltage pulse necessary for the inversion of the liquid crystal molecule is large and the width of the voltage pulse producing the AC stabilized effect is small. An ordinary driving method comprises, therefore, superimposing high-frequency AC waveforms generated from a signal electrode.

The AC stabilized effect-producing voltage significantly varies also depending on the orientation state of the ferroelectric liquid crystal element. Namely, the stabilized effect-producing voltage is low when the orientation is in the uniform, bi-stable states, but the voltage is quite high when the orientation is twisted. To solve this problem, it has been demanded to produce uniform, bi-stable orientation states by suitably combining a ferroelectric liquid crystal material with an oriented film.

SUMMARY OF THE INVENTION

An object of the present invention is to provide a ferroelectric liquid crystal composition capable of producing the AC stabilized effect at a low voltage and having a high response speed.

In accordance with the present invention, there is provided a ferroelectric liquid crystal electric-optical device, which comprises a pair of plates having driving electrodes and ferroelectric liquid crystal material sandwiched between the plates, the ferroelectric liquid crystal material comprising a ferroelectric liquid crystal composition 10 to 80% by weight of a compound of the general formula:

wherein $R_1$ represents an alkoxy group or acyloxy group, alkoxy group, alkyl group having an asymmetric carbon atom, or a straight-chain alkyl or alkoxy group, and $R_2$ represents an alkyl group having an asymmetric carbon atom or a straight-chain alkyl group.

Another aspect of the present invention is to provide an alignment layer whereby a ferroelectric liquid crystal can easily produce hi-stable uniformly oriented states.

Furhter aspect of the present invention is to provide an electro-optical device having a high contrast and an excellent response and capable of producing the AC stabilized effect at a low voltage.

DETAILED DESCRIPTION OF THE INVENTION

Figure 4:
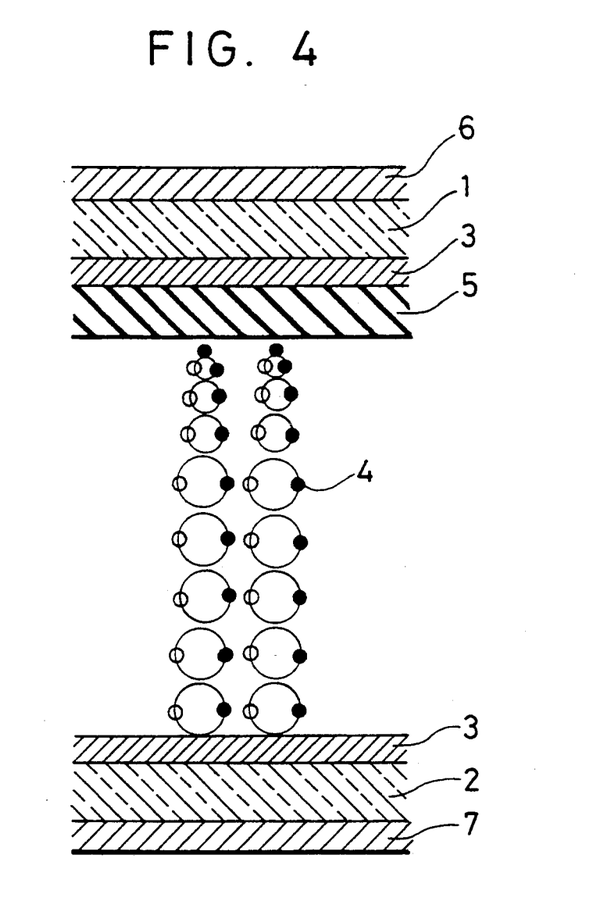
FIG. 4 is a sectional view of a ferroelectric liquid crystal electro-optical device.

The present invention is directed to solve the problems of the prior art described above, and provides a ferroelectric liquid crystal electro-optical device having a structure shown in FIG. 4. In this drawing, reference numerals 1 and 2 represents two substrates that are disposed in parallel with each other. At least one of the substrates is transparent. Reference numeral 3 represents an electrode film formed on the inner surface of the substrates, which is used for applying a voltage to liquid crystal molecules 4 sandwiched between the substrates 1 and 2. Reference numeral 5 represents an alignment film having uniaxial alignment characteristic. The uniaxial alignment characteristic can be obtained by rubbing a thin layer made of an organic film such as, polyamide, poly vinylalcohol, fluorine-contamed polymer and silane. Reference numerals 6 and 7 represents polarizer. The ray of right polarized by the polarizer 6 on the incident side reaches the polarizer 7 on the outgoing side.

The present invention provides a ferroelectric liquid crystal element capable of switching between two hi-stable states by taking advantage of the spontaneous polarization of a ferroelectric liquid crystal and its negative dielectric anisotropy and also capable of increasing the optical density ratio by the AC stabilized effect. This element comprises a ferroelectric liquid crystal composition comprising a compound having a phenyl-pyridazine core. With this element, the AC stabilized effect is obtained with only a low AC voltage and a high speed response is made possible.

The liquid crystal material used for the present invention contains a suitable amount of a compound of the general formula:

(1)

wherein $R_1$ represents an alkoxy group or acyloxy group, alkoxy group, alkyl group having an asymmetric carbon atom, or a straight-chain alkyl or alkoxy group, and $R_2$ represents an alkyl group having an asymmetric carbon atom or a straight-chain alkyl group.

We have already applied for a patent on these compounds themselves. The transition temperatures of typical examples of them are given in Table 1.

TABLE 1

Transition temperature of $R_1$–⌬–⌬–$R_2$:
        N—N

| No. | $R_1$ | $R_2$ | Transition temperature |
|---|---|---|---|
| 1 | CH$_3$<br>\|<br>C$_2$H$_5$CHCH$_2$O<br>* | —C$_6$H$_{13}$-n | Cry $\underset{88}{\overset{93}{\rightleftarrows}}$ Iso |
| 2 | CH$_3$<br>\|<br>C$_2$H$_5$CHCH$_2$O<br>* | —C$_8$H$_{17}$-n | Cry $\underset{84}{\overset{93}{\rightleftarrows}}$ Iso |
| 3 | CH$_3$<br>\|<br>C$_2$H$_5$CH(CH$_2$)$_2$O<br>* | —C$_6$H$_{13}$-n | Cry $\rightleftarrows$ 78 Sc $\overset{88}{\rightarrow}$ 82 Iso |
| 4 | CH$_3$<br>\|<br>C$_2$H$_5$CH(CH$_2$)$_3$O—<br>* | —C$_6$H$_{13}$-n | Cry $\overset{79}{\rightleftarrows}$ 51 Sx 79 Sc* $\overset{100}{\rightarrow}$ Iso |
| 5 | CH$_3$<br>\|<br>C$_2$H$_5$CH(CH$_2$)$_3$O—<br>* | —C$_8$H$_{17}$-n | Cry $\overset{76}{\rightleftarrows}$ 53 Sx 67 Sc* $\overset{102}{\rightarrow}$ Iso |
| 6 | CH$_3$<br>\|<br>C$_2$H$_5$CH(CH$_2$)$_4$O—<br>* | —C$_8$H$_{17}$-n | Cry $\underset{43}{\overset{62}{\rightleftarrows}}$ Sc* $\overset{97}{\rightarrow}$ Iso |
| 7 | CH$_3$<br>\|<br>C$_2$H$_5$CH(CH$_2$)$_5$O—<br>* | —C$_6$H$_{13}$-n | Cry $\underset{77}{\overset{88}{\rightleftarrows}}$ Sc* $\overset{97}{\rightarrow}$ Iso |
| 8 | CH$_3$<br>\|<br>C$_2$H$_5$CH(CH$_2$)$_5$O—<br>* | —C$_8$H$_{17}$-n | Cry $\overset{98}{\rightleftarrows}$ 77 Sx 80 Sc* $\overset{117}{\rightarrow}$ Iso |
| 9 | CH$_3$<br>\|<br>C$_6$H$_{13}$CHO—<br>* | —C$_8$H$_{17}$-n | Cry $\underset{47}{\overset{54}{\rightleftarrows}}$ Iso |
| 10 | CH$_3$<br>\|<br>C$_6$H$_{13}$CHCH$_2$O—<br>* | —C$_8$H$_{17}$-n | Cry $\underset{72}{\overset{85}{\rightleftarrows}}$ Iso |

TABLE 1-continued

Transition temperature of

| No. | R₁ | R₂ | Transition temperature |
|---|---|---|---|
| 11 | $\underset{*}{C_2H_5\overset{CH_3}{\overset{|}{C}H}(CH_2)_2}\underset{\underset{O}{\|}}{C}O-$ | $-C_8H_{17}\text{-n}$ | Cry $\underset{41}{\overset{55}{\rightleftarrows}}$ Sx $\underset{}{\overset{70}{\rightleftarrows}}$ So* $\overset{96}{\to}$ Iso |
| 12 | $\underset{*}{C_2H_5\overset{CH_3}{\overset{|}{C}H}CH_2O(CH_2)_3O-}$ | $-C_6H_{13}\text{-n}$ | Cry $\overset{66.5}{\underset{52}{\searrow}}$ Sc* $\overset{}{\underset{65.5}{\nwarrow}}$ Iso |
| 13 | $\underset{*}{C_2H_5\overset{CH_3}{\overset{|}{C}H}CH_2O(CH_2)_3O-}$ | $-C_8H_{17}\text{-n}$ | Cry $\underset{42}{\overset{54}{\rightleftarrows}}$ Sc* $\overset{69}{\to}$ Iso |
| 14 | $\underset{*}{C_2H_5\overset{CH_3}{\overset{|}{C}H}CH_2O(CH_2)_4O-}$ | $-C_6H_{13}\text{-n}$ | Cry $\underset{63.5}{\overset{77.5}{\rightleftarrows}}$ Sc* $\overset{82.7}{\to}$ Iso |
| 15 | $\underset{*}{C_2H_5\overset{CH_3}{\overset{|}{C}H}CH_2O(CH_2)_4O-}$ | $-C_8H_{17}\text{-n}$ | Cry $\underset{44}{\overset{62}{\rightleftarrows}}$ Sc* $\overset{86}{\to}$ Iso |
| 16 | $\underset{*}{C_4H_9O\overset{CH_3}{\overset{|}{C}H}CH_2O-}$ | $-C_8H_{17}\text{-n}$ | Cry $\underset{51}{\overset{63}{\rightleftarrows}}$ Sx $\underset{79}{\overset{81}{\rightleftarrows}}$ Iso |
| 17 | n-$C_8H_{17}O-$ | $-C_8H_{17}\text{-n}$ | Cry $\overset{95}{\underset{78\ Sx}{\searrow}}$ $\underset{90}{\nwarrow}$ Sc $\overset{119}{\to}$ Iso |
| 18 | n-$C_{10}H_{21}-$ | $-C_6H_{13}\text{-n}$ | Cry $\overset{64}{\underset{21\ Sy}{\searrow}}$ $\underset{42}{\nwarrow}$ Sx $\underset{66}{\overset{78}{\rightleftarrows}}$ Sc* $\overset{83.5}{\to}$ Iso |
| 19 | n-$C_7H_{15}-$ | $-C_8H_{17}\text{-n}$ | Cry $\overset{79}{\underset{66\ Sx}{\searrow}}$ $\underset{70}{\nwarrow}$ Sc* $\overset{91}{\to}$ Iso |
| 20 | n-$C_7H_{15}-$ | $-(CH_2)_4\overset{CH_3}{\overset{|}{C}H}.C_2H_5$ | Cry $\overset{78}{\underset{63\ Sx}{\longrightarrow}}$ $\underset{65}{\nwarrow}$ Sc* $\overset{74}{\nearrow}$ Iso |
| 21 | $\underset{*}{C_2H_5\overset{CH_3}{\overset{|}{C}H}(CH_2)_3-}$ | $-C_8H_{17}\text{-n}$ | Cry $\underset{35}{\overset{52}{\rightleftarrows}}$ Sc* $\overset{54}{\to}$ S$_A$ $\overset{62}{\to}$ Iso |
| 22 | $\underset{*}{C_2H_5\overset{CH_3}{\overset{|}{C}H}(CH_2)_3-}$ | $-(CH_2)_4\overset{CH_3}{\overset{|}{C}H}C_2H_5$ | Cry $\underset{15}{\overset{52}{\rightleftarrows}}$ Sx $\overset{58}{\to}$ Iso |

In Table 1, the notation * means an asymmetric carbon atom.

In Table 1, the notation * means an asymmetric carbon atom.

The phenylpyridazine compounds of the general formula (1) have a negative dielectric anisotropy due to nonuniform distribution of electrons in the pyridazine ring. The value of $\Delta_\epsilon$ ranges from $-1$ to $-4$. Compounds having a negative dielectric anisotropy usually used heretofore have such a structure that the core benzene ring has a group having a high electron attractivity ($-C\equiv N$, Cl or F) at the o- or m-position thereof as shown by the following general formula:

wherein $R_5$ and $R_6$ each represent an alkyl, alkoxy or acyloxy group, X represents —OCH₂— or the like, represents a benzene ring, a pyrimidine ring or the like, n represents 0 or 1 and one or two of —C≡N, —F or —Cl are present at the positions of $Y_1$ to $Y_4$.

As for the structure of the molecule of such a compound, it projects sideways and, due to the nonuniform distribution of electrons, the lateral intermolecular interaction is increased to impair the response. The lateral projection also reduces the liquid crystallinity. Namely, the temperature zone for the liquid crystal phase of the bicyclic compound is lowered.

On the contrary, although phenylpyridazine liquid crystals have a high negative dielectric anisotropy, they have a high liquid crystallinity, since they have no lateral projection. Although the intermolecular interaction thereof is high due to the nonuniform distribution of electrons, they are capable of forming a ferroelectric liquid crystal composition having an excellent response by blending them with a compound capable of weakening the interaction. Another feature of the phenylpyridazine compounds is that they have a high liquid crystal phase temperature zone. They are thus capable of forming a liquid crystal composition having a ferroelectric liquid crystal up to a high temperature including room temperature. It was experimentally proved that a ferroelectric liquid crystal composition containing a suitable amount of a phenylpyridazine compound is suitable for use for the production of a ferroelectric liquid crystal element that gives a high contrast by utilizing the AC stabilized effect and that with this composition, an element having an excellent response can be obtained.

The amount of the phenylpyridazine compound is preferably 10 to 80% by weight, particularly preferably 20 to 70% by weight, since when it is less than 10%, the feature of this compound cannot be exhibited and when it exceeds 80%, the demerit of this compound that it is apt to be crystallized even if the compound to be blended therewith is varied cannot be overcome.

The liquid crystalline compound to be blended with the phenylpyridazine compound is preferably one having a low viscosity and a low or negative dielectric anisotropy. They are represented by the following general formula:

(2)

$R_3$ represents a straight-chain alkyl group of $C_5$–$C_8$ or an alkyl group having an asymmetric carbon atom of $C_5$–$C_9$, $R_4$ represents a straight-chain alkyl group and X represents

When a liquid crystal compound of the above general formula is blended with the ferroelectric liquid crystal compound, rotational viscosity thereof is reduced. Typical compounds and transition temperatures of them are given in Table 2. These liquid crystal compounds have a negative or low positive dielectric anisotropy and improve the switching response without exerting substantial influence on the dielectric properties of the phenylpyridazine compound.

TABLE 2

$R_3O-\langle\bigcirc\rangle-X-\langle\bigcirc\rangle-R_4$

| No. | $R_3$ | $R_4$ | X | Transition temperature |
|---|---|---|---|---|
| 1 | n-$C_5H_{11}$— | n-$C_{11}H_{23}$— | —C(=O)—O— | Cry ⇌ 57.5 Iso, *Ne ← 55 |
| 2 | n-$C_8H_{17}$— | n-$C_8H_{17}$— | —C(=O)—O— | Cry ⇌ 51 $S_A$ → 64 Ne → 66 Iso |
| 3 | CH₃ / $C_2H_5$CH(CH₂)₅— | n-$C_8H_{17}$— | —C(=O)—O— | Cry ⇌ 38 Ch → 45 Iso, *Sc* ← 38 |
| 4 | CH₃ / $C_2H_5$CH(CH₂)₅— | n-$C_8H_{17}$— | —OC(=O)— | Cry ⇌ 37 Ch → 44 Iso, 33 Sc* ← 35 |
| 5 | CH₃ / $C_2H_5$CHCH₂— | n-$C_{11}H_{23}$— | —CO(=O)— | Cry ⇌ 27 Iso, 17 Ch ← 20 |
| 6 | n-$C_7H_{15}$— | n-$C_{10}H_{21}$— | —C≡C— | Cry ⇌ 42 Sx → 54.5 Ne → 65 Iso |

TABLE 2-continued

| No. | R₃ | R₄ | X | Transition temperature |
|---|---|---|---|---|
| 7 | n-C₇H₁₅— | n-C₁₁H₂₃— | —C≡C— | Cry $\underset{*}{\overset{41}{\rightleftarrows}}$ Sx $\xrightarrow{54}$ Ne $\xrightarrow{59}$ Iso |
| 8 | n-C₈H₁₇— | n-C₈H₁₇— | —C≡C— | Cry $\underset{*}{\overset{41}{\rightleftarrows}}$ S$_A$ $\xrightarrow{61}$ Ne $\xrightarrow{70}$ Iso |
| 9 | CH₃<br>\|<br>C₂H₅CH(CH₂)₅— | n-C₈H₁₇— | —C≡C— | Cry $\underset{*27}{\overset{35}{\rightleftarrows}}$ Sx $\xrightarrow{42}$ Sc* $\xrightarrow{48}$ Ch $\xrightarrow{51}$ Iso |

One or more of the liquid crystal compounds of the general formula (2) can be blended with the phenylpyridazine compound. The amount of the former is preferably 10 to 60% by weight. When it is less than 10% by weight, the effect of reducing the rotational viscosity is insufficient and when it exceeds 60% by weight, the upper limit of the smectic phase temperature is seriously lowered unfavorably and significant effects are exerted on the dielectric properties of the phenylpyridazine compound.

Another liquid crystal compound may be added to the mixture of the liquid crystal compounds of general formulae (1) and (2). Compounds of the following general formulae (3) and (4), etc. may be added thereto in order to adjust the rotational viscosity, spontaneous polarization and pitch value:

(3)

(4)

wherein R₇ represents an alkoxy or acyloxy of C₂–C₇ which may be substituted with halogen atom or CN, R₈ represents an alkyl of C₇–C₁₀, R₉ represents an alkoxy group, and R₁₀ represents an alkoxy carbonyl having asymmetric carbon atom.

However, the compounds of the general formula (3) having the phenylpyrimidine skeleton have a positive dielectric anisotropy and, therefore, when they are blended in a large amount, the negative dielectric anisotropy of the phenylpyridazine compounds is lost. The value of the spontaneous polarization can be adjusted with even a small amount of a compound of the above formula (3) or (4) wherein R₇ or R₉ represents $$C_nH_{2n+1}\overset{X}{\underset{|}{C}}HCH_2O- \quad \text{or} \quad C_nH_{2n+1}\overset{X}{\underset{|}{C}}HCOO-$$

wherein n represents an integer of at least 2 and X represents F, Cl, CN— or the like, without seriously impairing the dielectric properties of the phenylpyridazine compounds.

As for the suitability for the oriented film, the bi-stable uniform orientation states are desirable for producing the AC stabilized effect at a low voltage. Further, the AC stabilized effect tends to be produced at a low voltage even with twist orientation when the surface inversion easily occurs.

The ferroelectric liquid crystal composition mainly comprising the phenylpyridazine compound of the present invention tends to produce a twist orientation which difficultly causes surface inversion and a high voltage is necessitated for producing the AC stabilized effect when an oriented polyimide film is used. On the contrary, an oriented polyamide resin film having a polar energy lower than that of the oriented polyimide film membrane easily produces the uniform orientation. Particularly, an oriented film membrane of an aromatic ring-free polyamide such as nylon 6 has the uniform bi-stable orientation states. Also an oriented polyfumarate film easily produces the bi-stable uniform orientation states. In such a case, the voltage necessitated for producing the AC stabilized effect was low. The polyfumarates are represented by the general formula:

wherein X and Y each represent an alkyl group or a cyclic group such as a cyclohexane ring. Among them, poly(diisopropyl fumarate) or a combination thereof with poly(isopropyl 1,1,2,2-tetrahydroperfluorodecyl fumarate) produced uniform, bis-stable orientation states.

When a bi-stable uniform orientation is produced by using the ferroelectric liquid crystal composition based on a phenylpyridazine compound and a square-wave AC of at least 20 kHz is applied to a 1.5 μm thick cell, the production of the AC stabilized effect begins at about 7 V. In the initial orientation state, the apparent cone angle between the two ON-OFF memory states is about 15°. When a square-wave AC of 10 V is applied thereto, the apparent cone angle is increased to about 35°. At such an increased cone angle of about 35°, a contrast of higher than 20:1 can be obtained when a polarizing plate having a high degree of polarization is used as crossed Nicols.

When the value of the spontaneous polarization is suitably adjusted, the response of the above-described ferroelectric liquid crystal composition is accelerated. The response to a pulse width of about 25 μs is possible with a rectangular wave AC of a peak value of 30 V.

When a waveform generated when driven with a bias of one third of an ordinary value is used and the peak value of the voltage wave in the selected part is 30 V, the response is made at a pulse width of at least 25 μs and the AC stabilized effect is produced in the non-selected part to which a square-wave AC of 10 V is applied to produce a high contrast. On this level of the response speed, and animation display is possible even with a bias of one third of an ordinary value is given in FIG. 3A and an ordinary waveform used heretofore for the ordinary elements utiluzing the AC stabilized effect is given in FIG. 3B. It is apparent that the drive circuit is easier with the ordinary ⅓ bias waveform of FIG. 3A, while it cannot be obtained unless high frequency AC is superimosed upon the signal electrode of FIG. 3B.

The invention will be more clearly understood with reference to the following examples:

EXAMPLE 1

An SiO₂ film as an insulating layer was formed on each of two transparent substrates each having a transparent electrode. Then an oriented polydiisopropyl fumarate film having a thickness of 120 Å was formed thereon by spin coating followed by baking at 200° C. The two substrates were rubbed in order to realize a parallel orientation and a gapping agent was applied thereto to form a gap of 1.7 μm to thereby form a cell. A ferroelectric liquid crystal composition comprising the following compounds was poured into the cell.

liquid crystal composition 9.5% by wt.

9.5% by wt.

9.5% by wt.

9.5% by wt.

14.2% by wt.

14.2% by wt.

5.8% by wt.

7.9% by wt.

7.9% by wt.

12.0% by wt.

The ferroelectric liquid crystal composition prepared as described above had the following phase transition temperatures:

The liquid crystal cell containing the ferroelectric liquid crystal composition was heated to 70° C. and then slowly cooled. In the initial stage, two states, i.e. uniform up and down orientation states; and other two states, i.e. twist up and down orientation states were observed.

A square pulse waveform of ±20 V was applied to the cell at ambient temperature to effect switching between two uniform states. These states were observed with crossed Nicols to recognize black levels where the intensity of the transmitted light is low. The direction of the axis of the polarization indicates the apparent director. The apparent director angle of the two states was the apparent cone angle which was about 15°.

When a square-wave AC of 20 kHz was applied to the cell and the voltage was elevated, the apparent cone angle was widened by the AC stabilized effect to increase the so-called ON-OFF contrast. In this cell, the cone angle began to widen at ±6.5 V and the apparent cone angle was widened to 34° at ±10 V. When the axis of polarization was adjusted so that the quantity of the transmitted light in one of them would be minimum with the crossed Nicols, a contrast of 1:20 was obtained.

Figure 3A:
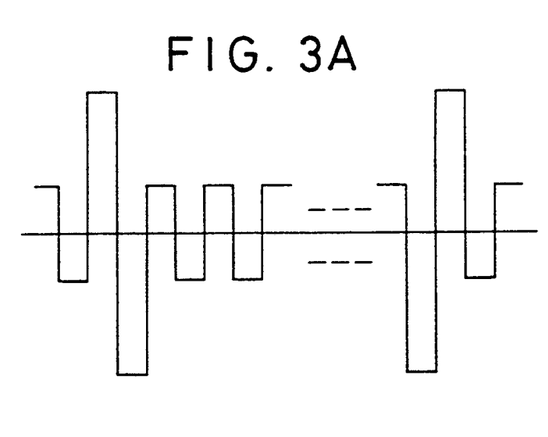
FIG. 3A shows a ⅓ bias switching waveform.
Figure 3B:
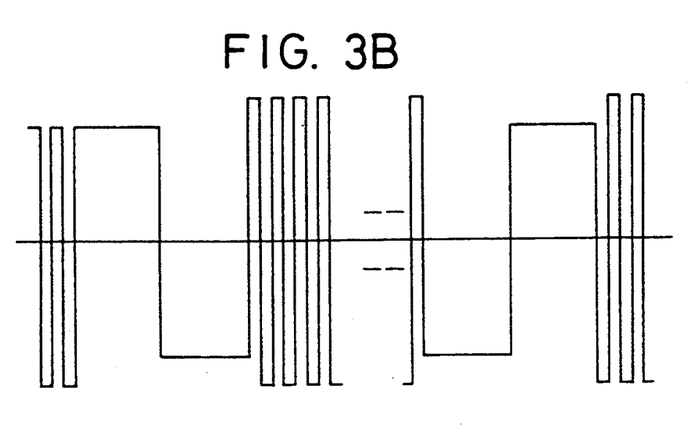
FIG. 3B shows an ordinary voltage waveform employed when the AC stabilized effect is utilized.

The response speed of the cell was 30 μsec (30 V, AC square-wave drive). When a voltage waveform of the switching waveform of ⅓ bias as shown in FIG. 3 (a) and a peak value of 30 V were applied, the cell responded to a pulse width of up to 30 μsec and the AC stabilized effect could be obtained with the AC waveform in the biassed part. Thus a high-contrast switching was possible.

EXAMPLE 2

An SiO$_2$ film as an insulating layer was formed on each of two transparent substrates each provided with an ITO electrode. Then a polyamide orientating agent (HL-1110) mfd. by Hitachi Chemical co., Ltd. was applied thereto and baked to obtain an oriented film having a thickness of 200 Å, which was rubbed in order to realize a parallel orientation on each side. A gapping agent was applied thereto to form a cell having a thickness of 1.5 μm. A ferroelectric liquid crystal composition comprising the following compounds was poured into the cell and the properties thereof were determined.

The composition prepared by blending the above-described 14 compounds in the above-described ratio had the following phase transition temperatures:

$$Cry \xrightarrow{8} Sc^* \xrightarrow{49} S_A \xrightarrow{53} Ch \xrightarrow{59} Iso$$

The cell containing the liquid crystal was heated to 70° C. and then slowly cooled. In the initial stage, four states, i.e. two uniform states and two twist stages of the orientation were observed.

A square pulse waveform of ±20 V was applied to the cell at ambient temperature to effect switching between the two uniform states. However, when the two uniform states were observed with crossed Nicols, the apparent director angle, i.e. the apparent cone angle, at which black levels could be recognized in both states was about 15°.

When a square-wave AC of 20 kHz was applied to the cell and the voltage was elevated, the apparent cone angle in the two uniform states was widened due to the AC stabilized effect. The cone angle began to be widened at ±6 V and it widened to 36° at ±10 V. When one of them was fixed so that the quantity of the transmitted light would be minimum with the crossed Nicols, a contrast of 1:25 was obtained.

The response speed of the cell was 25 μsec (AC drive, 30 V). When the switching waveform of ⅓ bias as shown in FIG. 3 (a) and a peak value of 30 V were applied, the cell responded to a pulse width of up to 25 μsec. Thus a high-contrast switching was possible ac-

EXAMPLE 3

An SiO$_2$ film as an insulating layer was formed on each of two transparent substrates each having a transparent electrode. Polydiisopropyl fumarate and poly(isopropyl-1,1,2,2-tetrahydroperfluorodecyl fumarate) in a weight ratio of 4:1 were dissolved in a solvent. The solution was applied thereto by spin coating and then baked to form an oriented film having a thickness of 150 Å. The two substrates were rubbed in order to realize a parallel orientation and a cell having a gap thickness of 1.5 μm was formed. A ferroelectric liquid crystal composition comprising the following compounds was poured into the cell.

liquid crystal composition n-C$_{10}$H$_{21}$—[Ph]—[Ph(N=N)]—C$_6$H$_{13}$-n 12.8% by wt.

n-C$_7$H$_{15}$—[Ph]—[Ph(N=N)]—C$_8$H$_{17}$-n 12.8% by wt.

C$_2$H$_5$CH(CH$_3$)CH$_2$CH$_2$O(CH$_2$)$_4$O—[Ph]—[Ph(N=N)]—C$_8$H$_{17}$-n
*

12.8% by wt.

n-C$_8$H$_{17}$O—[Ph]—COO—[Ph]—C$_8$H$_{17}$-n 14.8% by wt.

n-C$_5$H$_{11}$O—[Ph]—COO—[Ph]—C$_{11}$H$_{23}$-n 14.8% by wt.

n-C$_7$H$_{15}$O—[Ph]—C≡C—[Ph]—C$_{10}$H$_{21}$-n 9.9% by wt.

n-C$_5$H$_{11}$—[Ph(N,N)]—COO—[Ph]—C$_8$H$_{17}$-n 6.3% by wt.

CH$_3$(CH$_2$)$_4$CHF CH$_2$O—[Ph]—[Ph(N,N)]—C$_8$H$_{17}$-n
*

15.8% by wt.

The liquid crystal composition prepared as described above had the following phase transition temperatures:

$$Cry \underset{*}{\overset{26}{\rightleftarrows}} Sc^* \xrightarrow{47.5} S_A \xrightarrow{53} Ch \xrightarrow{57.5} Iso$$

The liquid crystal composition was poured into the cell, heated to 70° C. and slowly cooled. The properties of the product were determined at 30° C. In the initial stage, two uniform states were observed and the response speed of 8.5 μsec was obtained when a square-pulse waveform of ±20 V was applied. The AC stabilized effect was evaluated in the same manner as that of Examples 1 and 2. By the application of a square-wave AC of 20 kHz and ±10 V, the apparent cone angle was widened to 35°.

When the switching waveform of ⅓ bias as shown in FIG. 3A and a peak value was 30 V were applied, the cell responded to a pulse width of up to 20 μsec at 30° C. and a high contrast (23:1) was obtained according to the AC stabilized effect.

EXAMPLE 4

An SiO$_2$ film as an insulating layer was formed on each of two transparent substrates each provided with an ITO electrode. Then a polyamide orientating agent (HL-1110) mfd. by Hitachi Chemical co., Ltd. was applied thereto and baked to obtain an oriented film having a thickness of 200 Å, which was rubbed in order to realize a parallel orientation on each side. A gapping agent was applied thereto to form a cell having a thickness of 1.5 μm. A ferroelectric liquid crystal composition comprising the following compounds was poured into the cell and the properties thereof were determined.

liquid crystal composition

C$_2$H$_5$CH(CH$_3$)(CH$_2$)$_3$—[Ph]—[Ph(N=N)]—C$_8$H$_{17}$-n 29.3% by wt.

C$_2$H$_5$CH(CH$_3$)(CH$_2$)$_3$—[Ph]—[Ph(N=N)]—(CH$_2$)$_4$CH(CH$_3$)C$_2$H$_5$ 9.3% by wt.

n-C$_6$H$_{13}$O—[Ph]—[Ph(N,N)]—C$_9$H$_{19}$-n 7.0% by wt.

n-C$_7$H$_{15}$O—[Ph]—[Ph(N,N)]—C$_9$H$_{19}$-n 7.0% by wt.

n-C$_7$H$_{15}$O—[Ph]—[Ph(N,N)]—C$_{10}$H$_{21}$-n 7.0% by wt.

-continued

6.0% by wt.

12.6% by wt.

5.7% by wt.

4.7% by wt.

11.5% by wt.

The composition prepared by blending the above-described 10 compounds in the above-described ratio had the following phase transition temperatures:

The cell containing the liquid crystal was heated to 65° C. and then slowly cooled. In the initial stage, four stages, i.e. two uniform states and two twist stage of the orientation were observed.

A square pulse waveform of ±20 V was applied to the cell at ambient temperature to effect switching between the two uniform states. However, when the two uniform states were observed with crossed Nicols, the apparent director angle, i.e. the apparent cone angle, at which black levels could be recognized in both states was about 15°.

When a square-wave AC of 20 kHz was applied to the cell and the voltage was elevated, the apparent cone angle in the two uniform states was widened due to the AC stabilized effect. The cone angle began to be widened at ±5 V and it widened to 40° at ±10 V. When one of them was fixed so that the quantity of the transmitted light would be minimum with the crossed Nicols, a contrast of 1:32 was obtained.

The response speed of the cell was 25 μsec (AC drive, 30 V). When the switching waveform of ⅓ bias as shown in FIG. 3A and a peak value of 30 V were applied, the cell responded to a pulse width of up to 25 μsec. Thus a high-contrast switching was possible according to the AC stabilized effect of the AC waveform in the biassed part.

As described above, a liquid crystal element having a high response speed and a high contrast can be obtained by combining the ferroelectric liquid crystal composition with the adequate alignment film according to the present invention. Thus the AC stabilized effect is utilized and it is unnecessary to apply signals of different frequencies unlike in the prior art and an ordinary voltage waveform as employed in the conventional voltage leveling can be employed. Therefore, the circuit construction can be simplified. The response speed in preparing an animation in the present invention it allows picture reloading up to the number of the scanning electrodes of 500. Thus both high contrast and rapid response are possible by the technique of the present invention, so that it can effectively put the ferroelectric liquid crystal display to practical use.

Alternately, the phenylpyridazine LC materials is prepared as follows.

EXAMPLE 1

The synthesis of (S)-3-hexyl-6-(4-(6-methyloctyloxy) phenyl) pyridazine:

Dimethytformamid is added with 186 mg (60%) of sodium hydride and then added with 1.66 g of 4- (6-hexyl-3-pyridazinyl) phenol. The mixture is agitated for 30 minutes, and thereafter 1.93 g of tosylate of (S)-6 methyloctanol dissolved in 2 ml of dimethylformamide is dropped into the mixture. The reaction is conducted for 8 hours at 80° C. After the completion of the reaction, the reacted mixture is poured into ice water and extracted with using ethyl acetate. The organic layer is washed with water and dried, and thereafter condensed under reduced pressure. The thus processed product is purified by silica gel colum chromatography and recrystalization to obtain 0.8 g the destined compound having the following characteristic:

$[\alpha]_D^{25} + 4.25$ (C, 2.035 chloroform)

IR spectrum $\upsilon_{cm-1}{}^{nujol}$: 1618, 1590, 1522, 1260, 835

NMR spectrum $\gamma_{CDCl_3}{}^{TMS}$ (PPm): 8.02 d, 2H 7.87, d, 1H 7.27, d, 1H 6.98, d, 2H 4.00, t, 2H 2.98, t, 2H 0.6–2.10, m, 28H

EXAMPLE 2

Synthesis of (S)-3-n-hexyl-6-[4'-(2"-methylbutyloxypropyloxy) phenyl]pyridazine represented by the formula:

15 ml of dried N, N-dimethylformamide (hereinafter, referred to as "DMF") and 0.215 g of sodium hydride (about 60% suspension in oil) were introduced into a four-way flask having 50 ml of volume and provided with a cooling tube, a dropping funnel, a temperature gauge, and a calcium chloride tube. Next, 1.2 g of 3-n-hexyl-6-(4-hydroxyphenyl) pyridazine was dropped into the flask, and reaction was conducted until generation of hydrogen gas stopped. Thereafter, 1.33 g of (S)-p-toluensulfonic acid 2-methylbutyloxypropylester (this compound was synthesized from active amylalcohol) was dropped into the flask to conduct reaction for 9 hours at 80° C. After the completion of the reaction, the resulting product was poured into ice water and extracted with ether. The ether layer was washed by water and then dried, and organic solvent was evaporated away under reduced gas pressure. The obtained impure product was refined through silica gel-chromatography and recrystalization to obtain 0.8 g of (S)-n-hexyl-6-[4'-(2"-methylbutyloxypropyloxy) phenyl]pyridazine having the following characteristics:

Relative optic activity $[\alpha]_D^{25}$ + 1.33 (C = 2.03, CHCl$_3$)

IR $\nu_{max}^{nujol}$ (cm$^{-1}$)   1615, 1585, 1520, 1250, 1120, 835

HNMR $\delta_{TMS}^{CDCl_3}$ (ppm)   8.06, d, 2H
7.73, d, 1H
7.31, d, 1H
7.04, d, 2H
4.15, t, 2H
3.80, t, 2H
3.28, dd, 2H
3.01, t, 2H
0.65–2.38, m, 22H phase transition (°C.): Cry ⇌ 66.5 ⇌ Iso
                             ⇘ SmC* ⇗ 65.5

EXAMPLE 3

Synthesis of (S)-3-(5-methylheptyl)-6-(4-n-heptylphenyl) pyridazine represented by the formula:

I) Synthesis of (S)-9-methyl-1-(4-n-heptylphenyl)-1,4-undecadi-on represented by the formula:

Pour 4 g (14.5 m mol) of 3-(n-heptylbenzoyl) acrylic acid, 40 ml of ethanol and 1.54 g (14.5 m mol) of dried sodium carbonate into a 100 ml four-necked flask equipped with a cooling tube, a calcium chloride tube, a dripping funnel, a thermometer and an N$_2$ gas inlet tube, and allow the reaction to proceed for 15 minutes. After the reaction, pour it into 2.07 g (14.5 m mol) of (S)-5-methyloctanal, 0.39 g (14 m mol) of 3-benzyl-5-(2-hydroxyethyl) 4-methyl-1, 3-thiazoniumchloride and 1.47 g (14.5 m mol) of triethylamine, and them allow the reaction to proceed for 8 hours under reflux. After the completion of the reaction, the resulting product was poured into ice water including sulfuric acid, and was extracted by ethyl acetate. The ethyl acetate layer was washed by saturated calbonic acid solution water and sodium chloride solution, dried, and the organic solvent was evaporated away under reduced pressure. The obtained impure product was refined through silica gel chromatography and recrystalization to produce 3.2 g of (S)-9-methyl-1-(4-n-heptylphenyl)-1,4-undecadi-on, having the following characteristics:

Relative optical activity $[\alpha]_D^{25}$ + 4.18 (C = 2.03, CHCl$_3$)

IR $\nu_{max}^{nujoul}$ (cm$^{-1}$)   1719, 1687, 1608, 1572, 1240, 1181, 1088 844, 724.

$^1$HNMR $\delta_{TMS}^{CDCl_3}$ (ppm)   7.90, d, 2H
7.25, d, 2H
2.2~3.40, m, 8H
0.6~2.0, m, 28H II) Synthesis of (S)-3-(5-methylheptyl)-6-(4-n-heptylphenyl) pyridazine represented by the formula:

Pour 2.8 g of (S)-9-methyl-1-(4-n-heptylphenyl)-1, 4-undecazione and 20 ml of ethanol into a 50 ml four-necked flask equipped with a cooling tube, a dropping funnel, a calcium chloride tube, a thermometer and an N$_2$ gas inlet tube, heated and dissolved diketone. Next, drop 0.752 g of hydrazine into the flask and allow to react for 8 hours at 80° C. under N$_2$ flow. After the reaction, the reaction product was extracted by ethyl acetate. The organic layer was washed by water and saturated sodium chloride solution and evaporated away under reduced pressure and obtained 2.7 g of impure product 40 ml of ethanol and 0.25 g of 10% Pd/C (catalyst) were introduced into a four-necked flask equipped with a cooling tube, a calcium chloride column tube, a thermometer and an N$_2$ gas inlet tube, and allow to react for 4 hours in N$_2$ flow under reflux. After the completion of the reaction, pour ethyl acetate into the flask, filtered the catalyst utilizing a high-flow-super cell, and the organic solvent removed under reduced pressure, and then obtained 2.5 g of impure product. The obtained impure product was purified by silica gel chromatography and recrystalization to produce 1.2 g of (S)-3-(5-methylheptyl)-6-(4-n-heptylphenyl) pyridazine, having the following characteristics:

Relative optical activity $[\alpha]_0^{25}$ + 5.25 (C = 2.07, CHCl$_3$)

IR $\nu_{max}^{nujoul}$ (cm$^{-1}$)   1586, 1545, 1511, 1165, 1123, 1024, 896, 834, 724

$^1$HNMR $\delta_{TMS}^{CDCl_3}$ (ppm)   8.00, d, 2H
7.74, d, 1H
7.30, d, 3H
3.00, t, 2H
2.66, t, 2H
0.6~2.0, m, 28H transition temperature: Cry ⇌ 78° C. ⇌ Iso
63° C. ⇘ Sx ⇌ 65° C. Sc* ⇗ 74° C.

EXAMPLE 4

Synthesis of (S)-3-n-octyl-6-[4-(4-methylhexyl phenyl)]pyridadizine represented by the formula:

I) Synthesis of (S)-1-[4-(4-methylhexyl phenyl)]-1, 4-dodecadi-on represented by the formula:

5.82 g (21.2 m mol) of (S)-3-(4-methylhexybenzoyl) acrylic acid, 60 ml of ethanol and 2.24 g (21.2 m mol) of dried sodium carbonate were introduced into a 100 ml four-necked flask equipped with a cooling tube, a calcium chloride column tube, a dropping funnel, a thermometer and an N₂ gas inlet tube, and allow to react for 15 minutes. After the reaction, 3.16 g (22.2 m mol) of n-nonylaldehyde, 0.57 g (2.1 m mol) of 3-benzyl-5-(2-hydroxyethyl)-4-methyl-1, 3-thiazoniumchloride and 2.14 g (21.2 m mol) of triethylamine were dropped to effect reaction for 7 hours under the reflux. After the completion of the reaction, the resulting product was poured into ice water including sulfuric acid, and was extracted by ethyl acetate. The ethyl acetate layer was washed by diluted sulfuric acid solution, saturated carbonic acid solution, water and sodium chloride solution, dried, and the organic solvent was evaporated away under reduced pressure. The obtained impure product was refined through silica gel chromatography and recrystalization to produce 5.6 g of (S)-1-[4-(4-methylhexylphenyl)]-1, 4-dodecadi-on, having the following characteristics:

Relative optical activity $[\alpha]_D^{25}$ + 5.62 (C = 2.01, CHCl₃)

IR $\nu_{max}^{nujoul}$ (cm⁻¹)  1712, 1681, 1606, 1570, 1249, 1215, 1178 1129, 1091, 1032, 1007, 847, 817, 725

¹HNMR $\delta_{TMS}^{CDCl_3}$ (ppm)  7.92, d, 2H
7.26, d, 2H
2.2~3.45, m, 8H
0.6~2.0, m, 28H II) Synthesis of (S)-3-n-octyl-6-[4-(4-methylhexyl-phenyl)]pyridazine represented by the formula:

5.2 g of (S)-1-[4-(4-methylhexylphenyl)]-1, 4-dodecadi-on and 20 ml of ethanol were introduced into a 50 ml four-necked flask equipped with a cooling tube, a dropping funnel, a calcium chloride column tube, a thermometer and an N₂ gas inlet tube, heated and dissolved diketone. Next, drop 1.397 g of hydrazine into the flask and allow to react for 13.5 hours at 80° C. under N₂ flow. After the reaction, the resultant product was extracted by ethyl ether. The organic layer was washed by water and saturated sodium chloride solution and evaporated away under reduced pressure to obtain 5.05 g of impure produce. Thereafter, 5.05 g of the obtained impure product, 50 ml of ethanol and 0.46 g of 10% Pd/C as catalyst were introduced into a 50 ml four-necked flask equipped with a cooling tube, a calcium chloride column tube, a thermometer and an N₂ gas inlet tube, and allow to react for 11.5 hours in N₂ flow under reflux. After the completion of the reaction, pour ethyl acetate into the flask, filtered the catalyst utilizing a high-flow-super cell, and the organic solvent was removed under reduced pressure, and then obtained 5 g of impure product. The obtained impure product was purified by silica gel chromatography and recrystalization to produce 3.5 g of (S)-3-n-octyl-6-[4-(methylhexylphenyl)]pyridazine, having the following characteristics:

Relative optical activity $[\alpha]_D^{25}$ + 5.82 (C = 2.025, CHCl₃)

IR $\nu_{max}^{nujoul}$ (cm⁻¹)  1615, 1591, 1549, 1510, 1165, 1107, 1003, 872, 829, 791, 724, 567

¹HNMR $\delta_{TMS}^{CDCl_3}$ (ppm)  8.01, d, 2H
7.74, d, 1H
7.31, d, 3H
3.00, t, 2H
2.66, t, 2H
0.65~2.15, m, 28H transition temperature: Cry $\underset{35° C.}{\overset{52° C.}{\rightleftarrows}}$ Sc* $\overset{54° C.}{\rightleftarrows}$ S_A $\overset{62° C.}{\rightleftarrows}$ Iso

EXAMPLE 5

Synthesis of (S),(S)-3-(5-methlyheptyl)-6-[4-(4-methylhexylphenyl)]pyridazine represented by the formula:

I) Synthesis of (S),(S)-9-methyl-1-[4-(4-methylhexyl-phenyl)]-1,4-undecadi-on represented by the formula:

3.0 g (10.9 m mol) of(S)-3-(4-methylhexylbenzoyl) acrylic acid, 30 ml of ethanol and 1.15 g (10.9m mol) of dried sodium carbonate were introdeced into a 100 ml four-necked flask equipped with a cooling tube, a calcium chloride column tube, a dripping funnel, a thermometer and an $N_2$ gas inlet tube, and allow to react for 15 minutes. After the reaction, 1.55 g (10.9 m mol) of (S)-5-methyloctylaldehyde, 0.294 g (1 m mol) of 3-benzyl-5-(2-hydroxyethyl)4-methyl-1,3-thiazoniumchloride and 1.10 g (10.9 m mol) of triethylamine were dropped to effect reaction for 7.5 hours under reflux. After the completion of the reaction, the resulting product was poured into ice water including sulfulic acid, and was extracted by ethyl acetate. The ethyl acetate layer was washed by diluted-sulfuric acid solution, saturated-carbonic acid solution, water and sodium chloride solution, and was dried and then the organic solvent was evaporated away under reduced pressure. The obtained impure product was refined through silica gel chromatography and recrystalization to produce 2.6 g of (S),(S)-9-methyl-1-[4-(4-methylhexylphenyl)]-1,4-undecadi-on, having the following characteristics:

Relative optical activity $[\alpha]_D^{25}$ + 10.46 (C = 2.065, CHCl$_3$)

IR $\nu_{max}^{nujoul}$ (cm$^{-1}$)  1714, 1685, 1607, 1570, 1240, 1216, 1182 1092, 1015, 845, 816, 729

$^1$HNMR $\delta_{TMS}^{CDCl3}$ (ppm)  7.93, d, 2H
7.26, d, 2H
2.3~3.46, m, 8H
0.6~2.0, m, 28H II) Synthesis of (S),(S)-3-(5-methylheptyl)-6-[4-(4-methylhexylphenyl)]pyridazine represented by the formula:

2.4 g of (S),(S)-9-methyl-1-[4-(4-methylhexylphenyl)]-1,4-undecadi-on and 20 ml of ethanol were introdeced into a 50 ml four-necked flask equipped with a cooling tube, a dropping funnel, a calcium cholride column tube, a thermometer and an $N_2$ gas inlet tube, heated and dissolved diketone. Next, drop 0.82 g of hydrazine into the flask and allow to react for 9.5 hours at 80° C. under $N_2$ flow. After the reaction, the resultant product was extracted by ethyl ether. The organic layer was washed by water and saturated-sodium chloride solution and evaporated away under reduced pressure to obtain 2.4 g of impure product. Thereafter, 2.4 g of the obtained impure product, 20 ml of ethanol and 0.22 g of 10% Pd/C (catalyst) were introduced into a 50 ml four-necked flask equipped with a cooling tube, a calcium chloride column tube, a thermometer and an $N_2$ gas inlet tube, and allow to react for 6.5 hours in $N_2$ flow under reflux. After the completion of the reaction, pour ethyl acetate into the flask, filtered the catalyst utilizing a high-flow-super cell, and the organic solvent was removed away under reduced pressure, and then obtained 2.2 g of impure product. The obtained impure product was purified by silica gel chromatography and recrystalization to produce 1.2 g of (S),(S)-3-(5-methylhexyl)-6-[4-(4-methylhexylphenyl)]pyridazine, having the following characteristics:

Relative optical activity $[\alpha]_D^{25}$ + 11.44 (C = 2.01, CHCl$_3$)

IR $\nu_{max}^{nujoul}$ (cm$^{-1}$)  1616, 1586, 1546, 1511, 1161, 1120, 1009, 830, 726, 577

$^1$HNMR $\delta_{TMS}^{CDCl3}$ (ppm)  8.01, d, 2H
7.74, d, 1H
7.31, d, 3H
3.00, t, 2H
2.66, t, 2H
0.65~2.15, m, 28H transition temperature: Cry $\underset{15° C.}{\overset{52° C.}{\rightleftarrows}}$ Sx $\underset{}{\overset{58° C.}{\rightleftarrows}}$ Iso

S$_x$ means not-identified smectic phase.

What is claimed is:

1. A ferroelectric liquid crystal electro-optical device comprising:

a pair of plates having driving electrodes, the inner surface of at least one of the plates having an alignment membrane disposed thereon, the alignment membrane being selected from polyamide and polyfumarate alkyl ester and having an uniaxial alignment characteristic; and ferroelectric liquid crystal material sandwiched between the plates, the ferroelectric liquid crystal material having a negative dielectric liquid crystal material anisotropy and comprising a ferroelectric liquid crystal composition 10 to 80% by weight of a compound of the general formula:

wherein R$_1$ represents

, wherein m = 1-5 and n = 2-5,

, wherein p = 3-4, or

-continued and $R_2$ represents a straight-chain alkyl group of $C_6$–$C_8$, and wherein * indicates an asymmetric carbon atom.

2. A device as claimed in claim 1; wherein the liquid crystal molecules of the material is switched between bi-stable orientations by inversion of spontaneous polarization caused by the influence of an applied electric field and the switched state is held by AC-field stabilization effect.

3. A device as claimed in claim 2, wherein the device has a dot-matrix electrode construction comprising plural scanning electrodes and plural signal electrodes.

4. A device as claimed in claim 3; wherein the frequency of the AC voltage applied to the scanning electrodes is equal to that of the AC voltage applied to the signal electrodes.

5. A device as claimed in claim 1; wherein the uniaxial alignment characteristic is obtained by rubbing a thin layer made of polyamide or polyfumaric acid.

6. A device as claimed in claim 5; wherein the thin layer is made of poly diisopropyl fumarate.

7. A device as claimed in claim 1; wherein the ferroelectric liquid crystal composition contains 10 to 60% of a compound of the general formula:

wherein $R_3$ represents a straight-chain alkyl group of $C_5$–$C_8$ or an alkyl group having an asymmetric carbon atom of $C_5$–$C_9$, $R_4$ represents a straight-chain alkyl group of $C_8$–$C_{11}$, and X represents

8. (Amended) A device as claimed in claim 7; wherein the ferroelectric liquid crystal composition contains at least one compound represented by the formula (I) and (II):

wherein $R_7$ represents an alkoxy or acyloxy of $C_2$~$C_7$ which may be substituted with halogen atom or CN, $R_8$ represents an alkyl of $C_7$~$C_{10}$, $R_9$ represents an alkoxy group, and $R_{10}$ represents an alkoxy carbonyl having asymmetric carbom atom.

9. A device as defined in claim 1, wherein $R_1$ is

* * * * *